(No Model.) 3 Sheets—Sheet 2.
A. T. PIKE & P. A. LOY.
WEED AND LAWN MOWER.
No. 253,624. Patented Feb. 14, 1882.
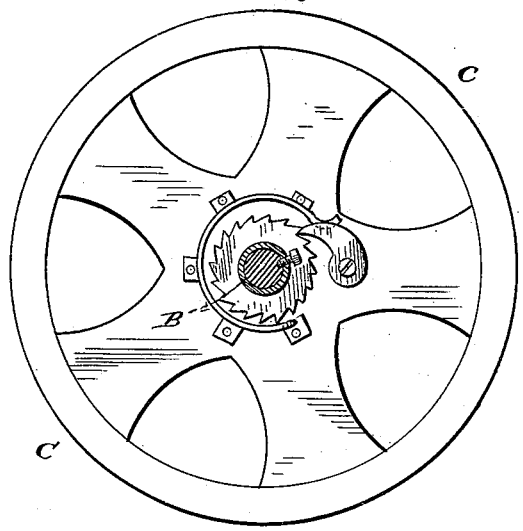
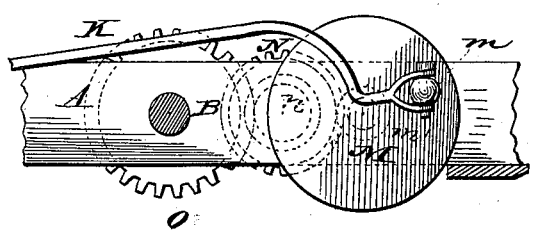
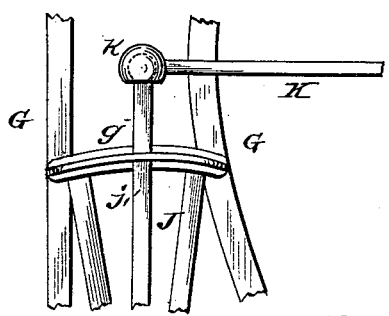
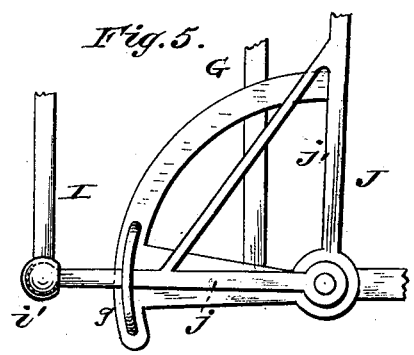
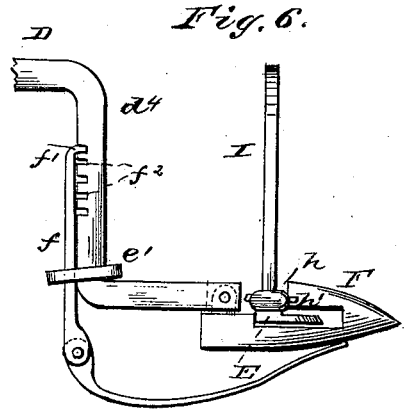
WITNESSES
Fred. G. Dieterich
D. C. Dietrich
INVENTORS
Alonzo T. Pike
Perry A. Loy
by N. W. Fitzgerald & Co. Attorneys
N. PETERS. Photo-Lithographer. Washington, D. C.

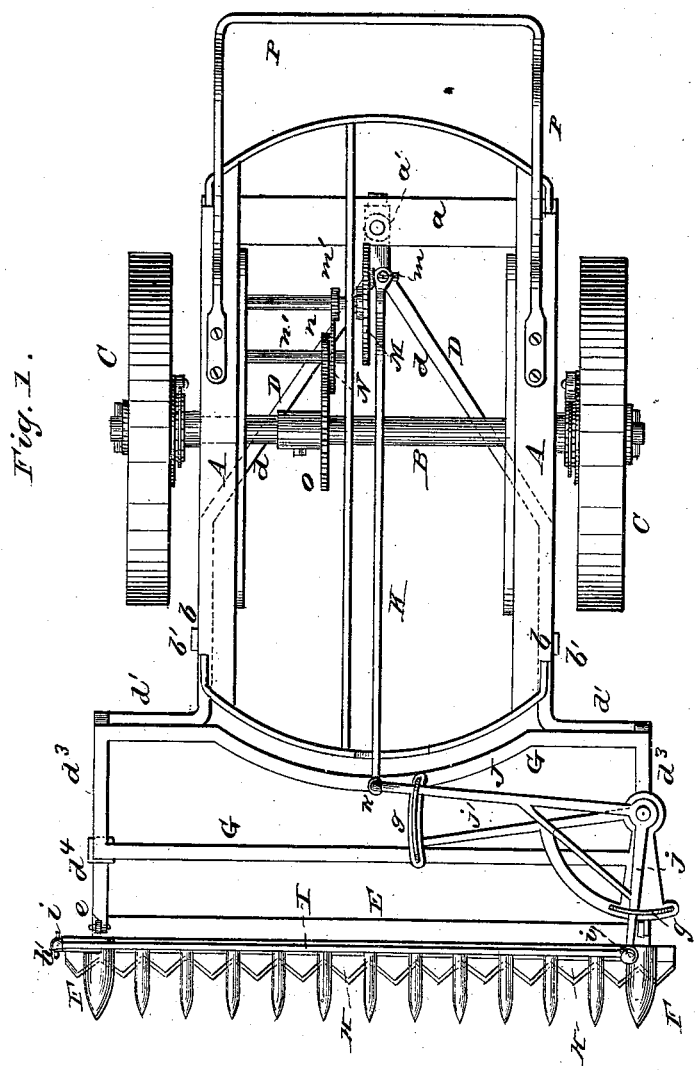

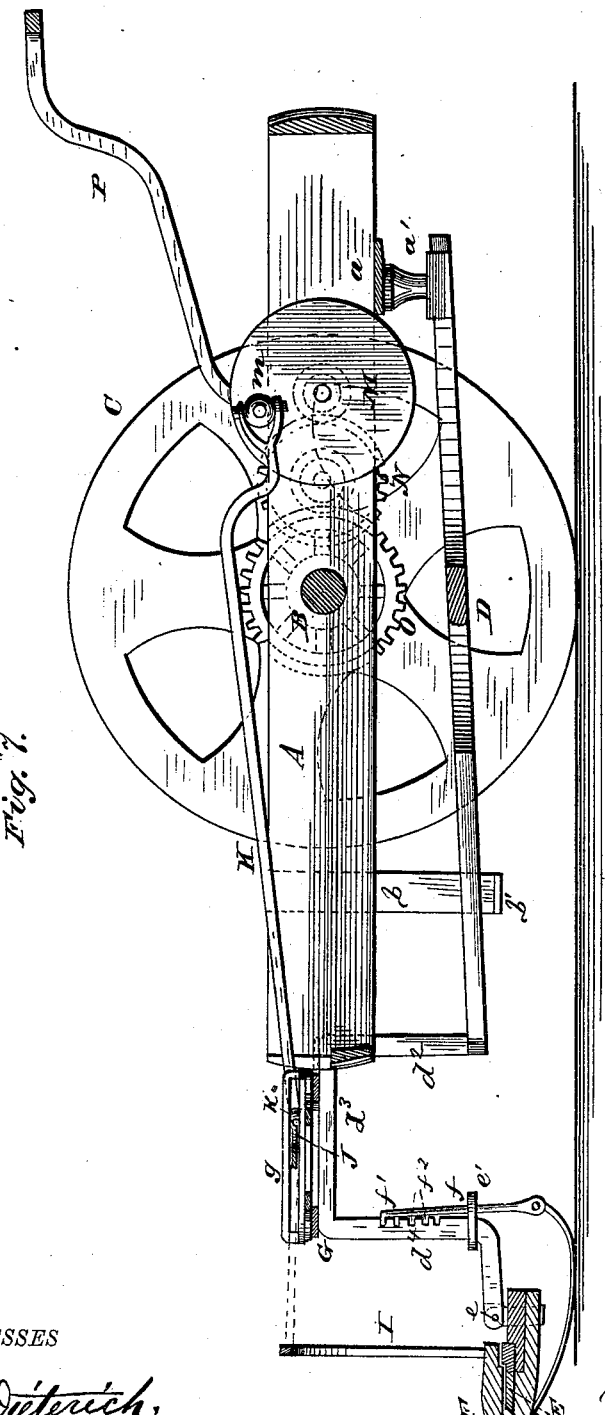

UNITED STATES PATENT OFFICE.

ALONZO T. PIKE AND PERRY A. LOY, OF CLARINDA, IOWA.

WEED AND LAWN MOWER.

SPECIFICATION forming part of Letters Patent No. 253,624, dated February 14, 1882.

Application filed September 17, 1881. (No model.)

*To all whom it may concern:*

Be it known that we, ALONZO T. PIKE and PERRY A. LOY, citizens of the United States, residing at Clarinda, in the county of Page and State of Iowa, have invented certain new and useful Improvements in Weed and Lawn Mowers; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to certain new and useful improvements in machines especially designed for cutting weeds and mowing grass smoothly on lawns; and it consists in novel features of construction and combination and arrangement of parts, all as will be hereinafter fully described, and specifically designated in the claims.

Referring to the accompanying drawings, Figure 1 represents a top view or plan of our improved machine. Figs. 2, 3, 4, 5, and 6 are detail views thereof. Fig. 7 is a longitudinal vertical section.

In the drawings, A represents the main or supporting frame of our improved machine, loosely journaled or mounted on the transverse shaft B, carrying the ground or supporting wheels C C, which are connected to said shaft by pawl-and-ratchet mechanism, so that said shaft will be turned through the medium of said wheels in the forward movement of the machine, but remain stationary, or the wheels revolve loosely thereon, during any backward movement of the machine.

D represents a bent and bifurcated or forked shaft connected to or suspended from a cross-bar, $a$, near the rear end of the main frame of the machine by a ball-and-socket joint, $a'$.

$b\ b$ are depending upright bars, secured at their upper ends to the outside and near the front of the frame A, and said bars are provided at their lower ends with inwardly-projecting right-angled portions $b'\ b'$ to raise the sickle-bar over obstructions, and in moving the machine more conveniently when not desired to cut, and which bars also keep the forked shaft from turning to the right and left and from striking the wheels.

The arms $d\ d$ of the shaft D are bent and extend outward at right angles near the front of the frame A, as shown at $d'\ d'$, thence upward and forward in front of the frame A to form horizontal supports $d^2\ d^2$, (for supporting some of the operating parts of the machine,) and thence downward and forward to form supports $d^3\ d^3$ for connecting the sickle-bar E thereto by hinged or pivotal connections $e\ e$.

F F represent two ground-shoes fastened in front to the end guards of the sickle-bar E, and connected at their rear ends by flexible joints or connections to the lower ends of the upright bars $f f$, having upper hooked ends, $f'\ f'$, adapted to engage notches $f^2\ f^2$ in the upright portions $d^4\ d^4$ of the bent arms $d$ of the bifurcated or forked shaft D, and held to their places by the slides $e'\ e'$, whereby said bars $f f$ can be vertically adjusted and secured in position when it is desired to raise or lower the sickle-bar.

G represents a light metallic frame secured on the horizontal supports $d^3\ d^3$ of the bent arms of the shaft D, for supporting some of the mechanism that operates the sickle H, the rear side of said frame being curved, so as to conform to the shape of the front of the main frame.

I represents the sickle-driver, having its bent end $i$ connected to one end of the sickle H by a mortise, $h$, in the latter and a pin, $h'$. This sickle-driver, which extends entirely over the sickle-bar lengthwise thereof, is connected at its outer end by a ball-and-socket joint, $i'$, to the end of the short arm $j$ of a pivoted right-angled or bell-crank lever, J, fulcrumed upon the frame G. The end of the long arm $j'$ of said lever J is connected by a ball-and-socket joint, $k$, to the forward end of the shake-rod K, having its rear forked end journaled to a ball, $m$, in any suitable manner, which is loosely mounted on the crank-pin of the wheel M, thus forming a double joint, in order to give said shake-rod the necessary side play required for operating the right-angled or bell-cranked lever J, the arms $j\ j'$ of which play or work in slotted guides $g g$, secured upon the frame G.

Upon the crank-wheel shaft M is mounted a small pinion, $m'$, that meshes with a large pinion, N, mounted on a shaft, $n'$, carrying a small pinion, $n$, that meshes with a large pinion or gear-wheel, O, mounted on the main shaft B, and through the medium of which the several pinions and mechanism connecting the sickle thereto gives to the sickle a motion of about eighteen strokes to the foot of forward progress when the machine is in operation.

By means of the several ball-and-socket-joint connections the point of the sickle-bar may be raised and lowered without causing any of the operating parts to bind, and having the bifurcated or forked shaft carrying the sickle-bar and sickle connected to the main frame by a ball-and-socket joint permits the sickle to cut smooth over rough or uneven ground, and also admits of the raising and lowering of the handle P of the machine to suit the height of the operator.

The upright bars $b\,b$ for supporting the shaft D permit the sickle-bar and sickle to be raised in passing over obstructions, and for convenience in moving the machine when not in operation, by merely pressing down on the handle P, which will raise the front end of the frame A, carrying said uprights, on account of said frame being loosely mounted on the shaft B.

By our construction and arrangement of parts the sickle-driver is arranged at eight or ten inches, or at such a height above the sickle-bar that the sickle will cut weeds and grass at most any height and without any liability of clogging, whereas most of the lawn-mowers in general use will only cut grass about three inches in height, and require about five times the operative power required for our machine for the same width of swath.

By changing the lengths of the arms of the bell-crank lever and also the dimensions of the crank the power of the machine may be increased without an increase of weight.

The operation of our improved machine is deemed obvious from the foregoing description, the sickle being operated through the medium of the drive or supporting wheels and intermediate connecting mechanism before described as the machine is moved forward over the ground, while the pawl-and-ratchet connections between shaft C and drive or supporting wheels permit said wheels to revolve loosely on said shaft as the machine is moved backward, and without motion to the sickle.

Having thus fully described our invention, what we claim as new, and desire to secure by Letters Patent, is—

1. In a weed and lawn mower, the combination of the pivoted main frame A, having the depending upright rigid bars $b\,b$, provided with hooked or right-angled ends $b'\,b'$, and the bifurcated or forked shaft D, constructed substantially as shown, and flexibly connected to the main frame A, substantially as and for the purposes specified.

2. In a weed and lawn mower, the combination, with the main frame A, of the bifurcated or forked shaft D, suspended from said frame near its rear end by a flexible connection, the arms $d\,d$ of said shaft extending forward of said frame and bent upward on substantially a horizontal line therewith and connected by the frame G, and the sickle-driver and operating mechanism, substantially as and for the purpose herein shown and described.

3. In a weed and lawn mower, the combination of the sickle-bar, flexibly connected to the arms of the bifurcated shaft, and the sickle-bar supporting-shoes flexibly connected to vertically-adjustable upright bars $f\,f$, connected to the arms of the bifurcated shaft, substantially as and for the purpose herein shown and described.

4. In a weed and lawn mower, the combination, with the supporting-shaft and wheels having pawl-and-ratchet connections, of the pivoted main frame provided with the supporting-arms $b\,b\,b'\,b'$, the bifurcated shaft D, flexibly connected at its rear end to the frame A and carrying at its forward end the sickle-bar and sickle, the sickle-driver connected to and extending over the entire length of sickle, and mechanism, substantially as described, for connecting said sickle-driver with the operating-gear of the machine, substantially as and for the purpose specified.

In testimony whereof we affix our signatures in presence of two witnesses.

ALONZO T. PIKE.
PERRY A. LOY.

Witnesses:
H. H. REBBLE,
F. M. MORLEDGE.